April 5, 1938.  J. F. PUTNAM  2,112,865
HELICAL FEED MECHANISM
Filed July 21, 1930  2 Sheets-Sheet 2
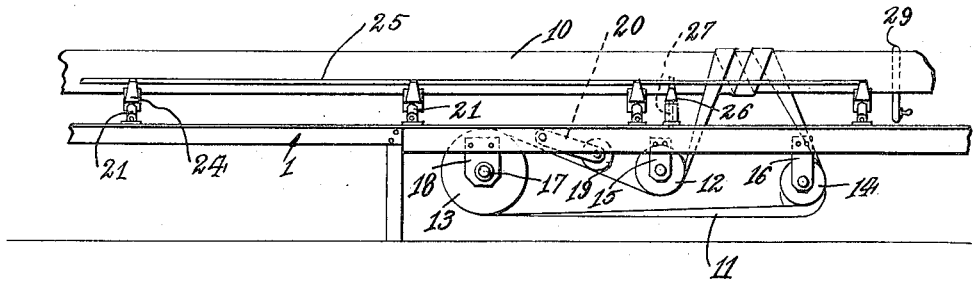
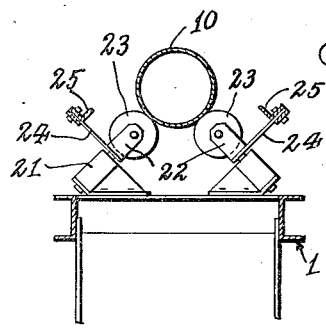
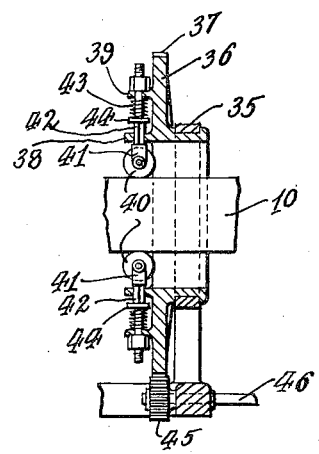
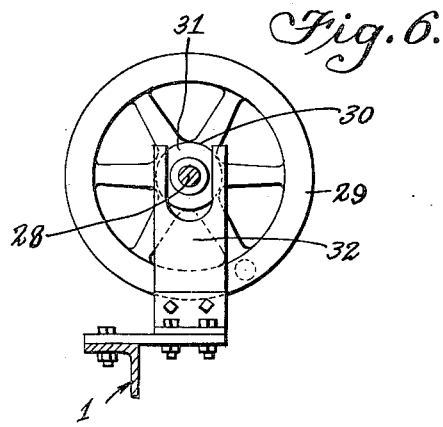
Inventor
Joseph F. Putnam
By Lyon & Lyon
Attorneys Patented Apr. 5, 1938

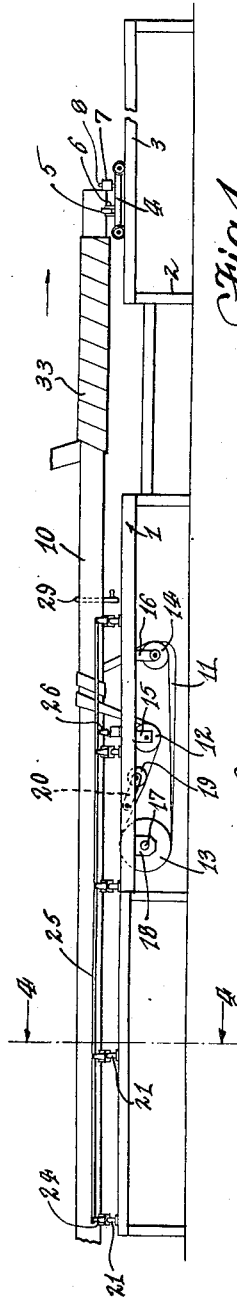

2,112,865

UNITED STATES PATENT OFFICE 2,112,865

HELICAL FEED MECHANISM

Joseph Franklin Putnam, Berkeley, Calif., assignor to Standard Oil Company of California, San Francisco, Calif., a corporation of Delaware Application July 21, 1930, Serial No. 469,289

6 Claims. (Cl. 242—11)

This invention relates to a mechanism or machine for imparting a helical feed or motion to cylindrical objects. More particularly, the invention relates to a helical feed mechanism for use with machines for wrapping or coating pipe, piles, poles and the like.

Mechanisms have been devised heretofore for helically advancing cylindrical objects, such as pipe. For example, the prior art has disclosed what is commonly known as the lathe type of machine, which consists of a headstock and a tailstock for supporting and rotating the pipe. Rotation may be imparted to the pipe by rotating the headstock or chuck and simultaneous longitudinal movement may be imparted to the pipe by moving the headstock or chuck longitudinally during its revolution. In some constructions the pipe travels past a stationary wrapping unit, while in other constructions the pipe remains rotatably fixed while the wrapping or coating mechanism travels longitudinally along the pipe.

When machines of this nature are used for wrapping pipe, where it is important that the edges of the laps abut closely to each other without actual overlapping, it becomes necessary to provide some means whereby the longitudinal feed is regulated proportionately to the rotary feed. The objection to the lathe type machine is that the machine must be stopped for a considerable period of time when changing lengths of pipe, thus causing considerable delay.

Another type of helical feed for pipes and the like comprises one or more power driven rollers which support the pipe while driving it forward and rotating it. The helical motion of the pipe is presumed to be controlled by the angle at which the driving roller contacts with the surface of the pipe. Often the driving rollers are mounted in a rotary ring, the ring rotating bodily around the pipe. This type of machine is comparatively complicated in construction and is expensive to build. Furthermore, it does not provide absolutely uniform speed such as is required for wrappings which are in abutted relation.

Still another type of helical feed is that known as the belt drive which employs an endless belt wrapped one or more times around the pipe, the belt extending over one or more pulleys, one of which is power driven. The helical motion of the pipe is controlled by the angle which the belt makes with the longitudinal axis of the pipe.

The difficulty of this type of drive is that the helical motion is not uniform, with the result that the laps of the wrapping do not abut properly or do not overlap equal amounts. The reason for the lack of uniformity in the helical motion of the pipe is that the frictional drag can, on account of the elasticity of the belt, retard the advance of the pipe during certain portions of the rotational cycle.

The present invention provides a helical drive mechanism which may utilize any form of means for imparting rotation to the pipe, in combination with independent means for translating or converting pure rotary movement of the pipe into a helical movement or into a longitudinal movement. A mechanism made in accordance with this invention may utilize a belt wrapped around the pipe for a portion of its length as a means for imparting rotation to the pipe, but the mechanism of this invention is not limited to nor does it utilize the angular relation of the belt to the axis of the pipe.

An object of the present invention is to provide a simple and relatively inexpensive helical drive mechanism.

An object of this invention is to provide a simple and inexpensive helical drive mechanism which enables the edges of the wrapping material to abut without overlapping.

Another object is to disclose and provide a mechanism for helically advancing cylindrical objects at a definitely regulatable speed.

Another object is to disclose and provide a machine for helically advancing cylindrical objects, in which a belt drive for rotating the pipe is employed but in which the angle which the belt makes with the pipe adjusts itself to whatever helical motion is imparted to the pipe by an auxiliary controlling means.

Another object of this invention is to disclose and provide a helical drive mechanism in which the longitudinal advance of the pipe or other cylindrical object per revolution thereof may be readily and definitely adjusted.

Other objects, uses and advantages of this invention will become apparent from the following detailed description of one illustrative form of the invention disclosed in the appended drawings, in which:

Fig. 1 is a side elevation of one form of mechanism embodying this invention.

Fig. 2 is a plan view of the machine shown in Fig. 1.

Fig. 3 is an enlarged portion, in side elevation, of the pipe rotating means shown in Fig. 1.

Fig. 4 is a vertical transverse section taken along the plane 4—4 indicated in Fig. 1.

Fig. 5 is an enlarged detailed view of the guide roller adjusting means as shown in Fig. 2.

Fig. 6 is a vertical section of the adjusting means taken on the plane 6—6 of Fig. 5.

Fig. 7 is a diagrammatic representation of a modified form of mechanism for imparting rotation to cylindrical objects.

As shown in the drawings, the machine may include a suitable base frame 1 in alinement with a discharge table 2 having tracks or guides 3 adapted to receive any suitable form of carriage 4 adapted to longitudinally move along the discharge table 2. The carriage 4 may be provided with rollers 5 journaled in suitable yokes 6 and may be provided with a roller 7 journaled on a vertical pin 8, the roller 7 being adapted to abut with the end of the pipe or other cylindrical object 10 being fed through the machine.

The machine may utilize any means for imparting rotation to the pipe. As shown in the drawings, the mechanism for imparting rotation to the pipe may comprise an endless belt 11 trained over the pipe 10 and passing over pulleys 12, 13 and 14. The pulleys 12 and 14 may be journaled on shafts held within hangers 15 and 16, respectively, the hangers 15 and 16 being attached to the base frame 1 of the machine. The pulley 13 may be mounted on a shaft 17 journaled within suitable hangers 18 carried by the frame 1, the shaft 17 being driven by any suitable driving mechanism. A weighted roller 19 journaled in a pivoted arm 20 attached to the frame 1 may rest against the belt 11 so as to maintain the same under tension. The pulley 14 may be mounted at an angle to the horizontal so as to prevent the belt 11 from slipping off the pulley.

Along the table or frame 1 and in spaced relation to each other brackets 21 may be mounted, the brackets being adapted to carry the spindles of yokes 22. The spindles may be loosely carried in the brackets 21 and at a 45° angle to the horizontal. The two rows of brackets 21 (one row on either side of the machine) thus carry the yokes 22 whose axes of rotation preferably meet when extended at some point above the table and between the two rows of brackets.

The yokes 22 carry freely rotatable rollers 23 journaled in the yokes. Arms 24 are preferably attached to the yokes 22 and extend outwardly from the table, the ends of the arms 24 being pivotally connected to a longitudinal bar 25. It will thus be seen that a longitudinal motion of the bar 25 will cause a simultaneous partial rotation of the yokes 22 in the brackets 21, thus changing the angularity of the rollers 23 with respect to the longitudinal axis of the machine and with respect to the longitudinal axis of the pipe 10 resting on the rollers 23.

Angular motion of the rollers 23 on one side of the machine is preferably translated into a simultaneous but opposite motion of the rollers 23 on the other side of the machine by means of a connecting link 26 pivotally connected to the main frame 1, as indicated at 27; preferably the pivot point 27 is centrally located immediately beneath the axis of the pipe 10.

The free ends of the pivoted link 26 are pivotally connected to the longitudinal bars 25 and 25'. The bar 25' may be provided with means for regulatably moving the same longitudinally. Such means may comprise, for example, a threaded portion 28 on one end of the bar 25 and a hand wheel 29 threadedly mounted on the ends 28 of the bar 25'. The hand wheel 29 may be provided with a hub 30 having a circular groove 31 therein, a stationary pin or trunnion 32 cooperating with such groove to prevent longitudinal motion of the hand wheel 29 when the same is rotated by permitting the rotary motion of said hand wheel to be translated into longitudinal motion of the bar 25'. Suitable means may also be provided for preventing rotation of the bar 25' if this is desired.

Between the driving mechanism and the discharge table 2 the machine may include suitable tanks for coating fluid, such as asphalt or asphaltic composition, and means for applying a wrapping material or bituminous mixture. For example, the pipe or other cylindrical object may be coated with a bituminous mastic and covered with a strip of paper, burlap or very thin flexible metal. Bituminous mastic coating of particular efficacy is disclosed in the copending application filed by McDonald et al., Serial No. 412,354. The wrapper and the coating applied to the pipe 10 is indicated diagrammatically at 33.

In operating the mechanism described hereinabove, a length of pipe is placed on the rollers 23 and manually advanced until the belt 11 may be looped thereover for one or two turns, as shown in Fig. 1. The shaft 17 is then driven, causing the belt 11 to rotate the pipe. If the rollers 23 are positioned so as to be able to rotate in a plane perpendicular to the longitudinal axis of the pipe 10, then the pipe 10 will be merely rotated but will not advance longitudinally. By adjusting the bar 25', however, as by means of the hand wheel 29, the angularity of the rollers 23 with respect to the longitudinal axis of the pipe may be changed. If the belt 11 is driven in the direction of the arrow, then by moving the bar 25' to the left the bar 25 will be caused to move to the right, thus causing the rollers 23 to lie in planes at an angle to the vertical. The pipe 10 will then advance longitudinally, the helical forward motion of the pipe being dependent upon the angle that the plane of rotation of the rollers 23 makes with the vertical. Expressed differently, it may be said that the longitudinal travel of the pipe will depend upon the angle between the axis of the pipe and the axis of rotation of the rollers 23.

It will thus be seen that the mechanism for adjusting the longitudinal movement of the pipe or other cylindrical body is independent of the means for imparting rotation to the cylindrical body, and that in accordance with this invention means have been provided for accurately adjusting the rate of longitudinal travel of the cylindrical object.

Naturally, the speed of rotation imparted to the pipe 10 by means of the belt 11 may be varied by changing the speed of the driven shaft 17 in any suitable manner, as for example by the introduction of gear trains which are not shown.

The angle that the belt 11 makes with the pipe plays no part in the helical motion imparted to the pipe when the mechanism is constructed as described hereinbefore. The inconsequential nature of the angular position of the belt with respect to the pipe is illustrated by the fact that the pulleys 12 and 14, for example, may be spaced from each other a greater or a shorter distance without influencing the longitudinal speed of the pipe as set or controlled by the position of the rollers 23. As a matter of fact, the pulley 14 may be mounted in a floating or pivoted bracket or hanger provided with a spring so as to yieldingly urge the pulley 14 outwardly and thus maintain the belt under tension, but the movement of the pulley 14 toward or away from the pulley 12 does not influence the longitudinal speed of the pipe 10.

In actual operation, the angularity of the belt 11 with respect to the pipe 10 will vary depending somewhat upon the helical or longitudinal motion of the pipe as predetermined by the setting of the rollers 23, the point of contact or the position of the belt 11 on the upper circumference of the pipe 10 shifting from right to left with variation in longitudinal advance caused by shifting of the rollers 23 by means such as the hand wheel 29.

It may be desirable to have the pulley 14 in a floating bracket so that the belt 11 may accommodate itself to variations in diameter of the pipe 10 or to variations caused by bent pipe which will then slightly oscillate instead of rotating about a substantially stationary longitudinal axis.

Instead of employing a belt 11 for imparting rotation to the pipe 10, a device such as shown in Fig. 4 may be substituted therefor. It is to be understood that the device shown in Fig. 7 is to be substituted only for the belt drive, and in accordance with this invention should be employed in combination with the feed adjusting mechanism comprising the rollers 23 and means for simultaneously changing the angularity of such rollers.

As shown in Fig. 7, the means for imparting rotation to the pipe may comprise a bearing 35 in which a rotatable ring 36 is journaled, the ring 36 having a spur gear 37 either formed integrally therewith at its periphery or attached thereto in any suitable manner. The ring 36 may be provided with flanges 38 and 39 extending therefrom, and rollers 40 journaled in yokes 41 provided with square shanks 42 slidably held in the brackets or flanges 38 may extend toward the center of the bearing 35 and the ring 36. A spring 43 interposed between one of the brackets, such as the bracket or flange 39 and a flange 44 connected to the shank 42 may press the roller 40 yieldingly inwardly in contact with the pipe 10. The rollers 40 rotate in planes passing through the axis of the pipe 10.

The roller ring 36 may be driven in any suitable manner, as for example from a spur gear 45 mounted on a drive shaft 46. Rotation of the ring 36 will, therefore, impart rotation to the pipe 10 without imparting a longitudinal or helical motion to the pipe 10, unless the rotation of the pipe 10 is translated into longitudinal motion by the angular position of rollers 23 carried by the main frame 1 of the machine. By having the rollers 40 journaled in the yokes 41 they do not hinder or obstruct the longitudinal movement of the pipe when such longitudinal movement is imparted thereto by the position of the rollers 23.

The free or coated end of the pipe 10 may be received in the movable carriages 4 which merely support the free ends. Adjoining lengths of pipe passing through the machine may be coupled together in any suitable manner, as for example, by the use of internal expanding type couplings which do not protrude beyond the outer surfaces of the pipe held in abutting relation, or do not protrude beyond the normal wrapped thickness or diameter of the pipe.

It will thus be seen that a machine has been provided which is capable of being used continuously as long as pipe are fed thereinto, and which is adapted for use with pipes of varying diameter. Furthermore, provision has been made for carefully and accurately adjusting the helical travel of the pipe whereby thick mastic wrappings or coatings may be applied to the pipe in abutting relation without the formation of overlapped joints or spaces between laps of the wrapping.

It is to be understood that numerous changes and modifications may be made in this invention without departing from the scope thereof. Between the driving element and the discharge table numerous tanks, sprays, brushes and the like may be introduced to clean, coat, heat or wrap the pipe or other cylindrical object.

This invention contemplates the use of all such auxiliary devices therewith, but is not limited to a machine primarily directed toward any specific wrapper or mode of wrapping or cleaning pipe.

All such changes and modifications as come within the scope of the appended claims are embraced thereby.

I claim:

1. A helical feed mechanism for cylindrical objects comprising means for rotating a cylindrical object and separate means for translating rotation of said object into a helical motion thereof, said last named means comprising a plurality of idler rollers adapted to support and guide the object, and means for simultaneously adjustably positioning said rollers on axes substantially perpendicular to axes of rotation of said rollers, whereby by adjustably positioning said rollers the helical motion of the cylindrical object may be regulated.

2. A mechanism for regulatably helically advancing cylindrical objects, comprising means for imparting rotary motion to the object, and separate means for producing and regulating helical motion of said object said last named means comprising a plurality of idler rollers adapted to support and guide the object, and means for simultaneously adjustably positioning said rollers in parallel planes angularly disposed with respect to the longitudinal axis of the object on axes substantially perpendicular to axes of rotation of said rollers, whereby by adjustably positioning said rollers the helical motion of the object may be regulated.

3. A helical feed mechanism for cylindrical objects including means for controlling helical advance of cylindrical objects, comprising a plurality of rollers in parallel planes angularly disposed with respect to the longitudinal axis of the object adapted to support and guide the object, and means for simultaneously adjustably positioning said rollers on axes substantially perpendicular to axes of rotation of said rollers, and separate means for rotating the object comprising a friction belt in driving frictional contact with the object, and means for driving said belt.

4. A machine for regulatably helically advancing pipe for wrapping purposes comprising means for imparting a rotary motion to the pipe and separate guide means for translating rotation of the pipe into a predetermined helical motion thereof, said guide means including a plurality of idler rollers having peripheral faces in contact with the pipe, said idler rollers being mounted on axes substantially perpendicular to axes of rotation of said rollers, and means for adjustably and simultaneously positioning said rollers to lie in planes angularly disposed with respect to the pipe axis for effecting a combined rotary and longitudinal movement of the pipe.

5. A pipe wrapping machine including means for rotating a pipe; guiding rollers, independent of said means, engageable with the pipe and angularly disposed with respect to the pipe axis for controlling the effect of said first named means to produce a combined rotary and longitudinal movement of the pipe; and means for simultaneously adjustably positioning said guiding rollers.

6. A pipe wrapping machine including means for rotating a pipe; guiding elements, independent of said means, engageable with the pipe and angularly disposed with respect to the pipe axis for controlling the effect of said first named means to produce a combined rotary and longitudinal movement of the pipe; and means for simultaneously adjustably posititioning said guiding elements.

JOSEPH FRANKLIN PUTNAM.